July 17, 1951 C. W. BRISTOL 2,560,788
ELECTRIC TEMPERATURE CONTROL APPARATUS
Filed Aug. 4, 1944
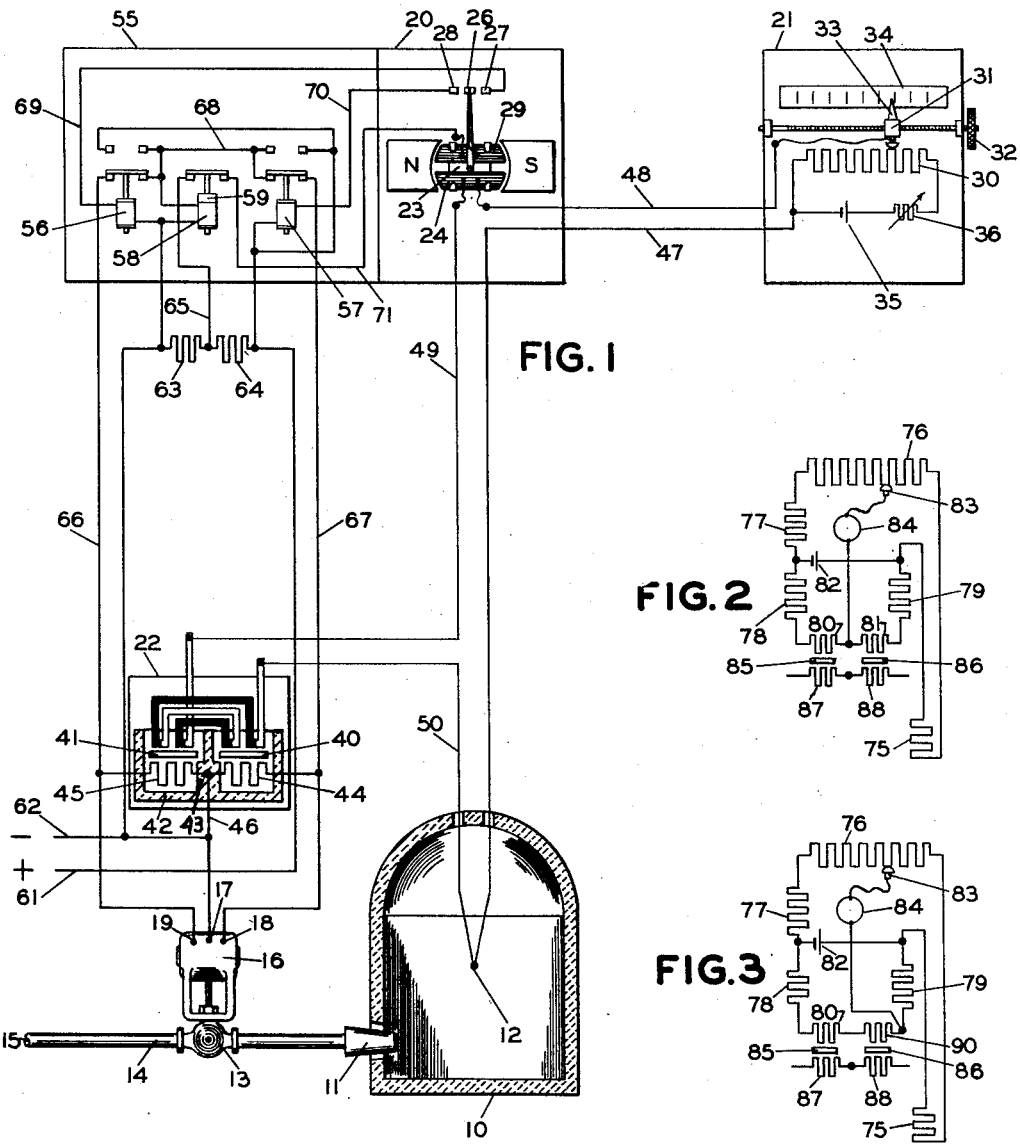
INVENTOR.
Carlton W. Bristol
BY
E. C. Sanborn
Attorney Patented July 17, 1951

2,560,788

UNITED STATES PATENT OFFICE 2,560,788

ELECTRIC TEMPERATURE CONTROL APPARATUS

Carlton W. Bristol, Naugatuck, Conn., assignor to The Bristol Company, Waterbury, Conn., a corporation of Connecticut Application August 4, 1944, Serial No. 548,097

12 Claims. (Cl. 236—78)

1

This invention relates to devices for automatically controlling the magnitude of a variable, and more especially to a control of the so-called "anticipatory" type, in which the response of a member sensitive to changes effected in said magnitude as a result of the controlling action is anticipated by the superposition upon said response of an auxiliary influence tending to exaggerate the effect of the regulation, and more or less directly derived from the controlling function, so that it may have the characteristic that said influence is more closely subject to the activity of the controlling action than is the change in the controlled magnitude.

It is a recognized fact that in the automatic regulation of a variable to a predetermined magnitude, the inertia of response of the movable members of the mechanism or the material under treatment, as for example, in the control of temperature in an oven or furnace, causes an inherent time lag in the process, so that there is a tendency for the controlled magnitude to overshoot, with consequent "hunting" and a more or less continuous oscillation about the control point. A number of attempts have been made to rectify this undesirable characteristic by causing the normal response of the member sensitive to changes in the controlled variable to be anticipated by a superimposed influence, whereby it is made to appear that the variable is approaching the control point more rapidly than is really the case, or has attained said point at a time when in actuality it is still changing toward said value.

In the application of "anticipatory" control to the regulation of temperature, it is the custom to associate with a temperature-sensitive electrical detecting and measuring network whereby the magnitude under regulation is determined and a control influence impressed upon the regulating mechanism, auxiliary means whereby conditions in said network are changed in response to the action of the control mechanism, thus in a manner temporarily falsifying the measurement to the extent that a control influence, after having been impressed upon the variable, is prematurely withdrawn. Examples of this practice are found in U. S. Letters-Patent 1,685,995 and 1,715,750, granted October 2, 1928, and June 4, 1929, respectively, to H. S. Gano. In the former of these is shown an automatic temperature regulator having control effected by means of an electric motor operated by suitable relays. The relays, in turn, are energized through a contacting pyrometer responsive to e. m. f. set up in a

2 thermocouple exposed to the temperature under regulation. "Anticipatory" operation is obtained by means of a pair of opposed auxiliary thermocouples connected in the pyrometer circuit, and exposed to the influence of individual heaters, energized by contacts on the motor relays, so that at any time the motor is operating, the corresponding auxiliary couple is being caused to exert its modifying influence on the pyrometer circuit, and thus cause the instrument to open its contacts in advance of actual attainment of the preestablished temperature by the space under control. In the latter of said Gano patents is shown apparatus characterized by similar performance and adapted to measurement of the regulated temperature by means of the electrical resistance thermometer principle.

Experience with controls of the type shown in the above-mentioned patents to Gano has demonstrated that, while it is possible to obtain regulation substantially free from hunting when the apparatus is adjusted for a given set of conditions, a change in the demand for heating agent, a change in the pressure at the source of supply, or a change in the set point, as well as any one of a number of other uncontrollable variables, may disturb the precision of regulation and allow the undesirable oscillations to reappear in the control characteristic.

An improvement upon the method shown by Gano is found in U. S. Letters-Patent No. 2,085,856, granted to O. H. Hunt et al., July 6, 1937. In this patent, provision is made to introduce into the pyrometer-controller circuit an e. m. f. additional to that developed by the thermocouple and in a sense to simulate the effect of an exaggeration of the change in temperature which will ultimately be brought about due to the movement of the valve, and thus afford an "anticipatory" action. Moreover, through the application of a further and opposing e. m. f. to the said circuit, a modification of the magnitude of the aforesaid introduced e. m. f. is effected and in a manner such as to be proportional to the activity of the pyrometer-controller. An alternative application of the principle of introduction of a supplementary potential in a thermocouple circuit is found in U. S. Letters-Patent No. 2,216,301, granted to H. T. Sparrow, Oct. 1, 1940, wherein an auxiliary couple in the temperature-sensitive network is subjected to a heating influence proportioned to the position of the control valve.

It has been found that in such installations as lend themselves to anticipatory control, the most effective and consistent results are obtained when the modifying influence is gradually withdrawn as the control point is approached, so that as said point is ultimately attained, the auxiliary effect becomes nil, and the deflecting influence impressed upon the measuring instrument becomes representative of the true value of the temperature under measurement. This characteristic is to some extent present in the above-mentioned Hunt et al. patent; but in order to achieve the desired result there is necessitated considerable auxiliary mechanism which materially detracts from the desirable simplicity of the installation.

It is an object of the present invention to provide an anticipatory control as hereinbefore defined, in which an auxiliary anticipating influence is introduced into a condition responsive circuit in a decreasing degree as the control point is approached.

It is a further object to provide a control of the above nature in which the progressive withdrawal of the auxiliary influence shall be accomplished with a minimum increase in the number of elements of control apparatus.

It is a further object to provide a control of the above nature which shall be equally adaptable to temperature controls whether the temperature is measured by a thermocouple pyrometer or a resistance thermometer.

A more specific object is to provide a control system in which a pre-established control point, as determined by an electrical measuring circuit, is approached by a regulating member operating in a series of successive increments, and where at the same time there is introduced into said electrical circuit an influence tending to anticipate conditions attendant upon an ultimate attainment of said control point, the magnitude of said influence being directly subject to the frequency and direction of said increments.

Another specific object is to provide suitable elements in the form of thermocouples or temperature-sensitive resistors, as the case may require, in the temperature-measuring circuit of an electrical control system, and to render said elements responsive to heating influences derived from the circuit of a regulating motor which receives its power in successive impulses having a progressively increasing time spacing as the control point is approached. Thus, the heating effect responsible for actuation of said elements will have a progressively decreasing mean value, and will become zero as the control point is attained.

Other features and advantages of the invention will be hereinafter described and claimed.

In the accompanying drawings:

Fig. 1 is a diagrammatic representation of the invention in its application to the automatic control of temperature as determined by thermocouple measurement in a fluid-fuel-fired furnace.

Fig. 2 shows adaptation of the invention to control where the temperature is determined by means of a resistance thermometer.

Fig. 3 is a modification of the arrangement shown in Fig. 2.

Fig. 4 is a modification of certain elements of the arrangement shown in Fig. 1.

The numeral 10 designates a furnace, oven, or other enclosed space adapted to be heated by the combustion of fluid fuel admitted thereto through a burner 11, and in which it is desired to maintain a predetermined constant temperature as determined by means of a thermocouple 12 located within the furnace, the regulation of said temperature being effected by control of the position of a valve 13 connected in a conduit 14 through which said fuel is supplied to the burner from a source 15. Operatively attached to the valve 13 is a reversible electric motor 16, which may be of any of the conventional types having two windings whose respective energizations determine the direction of rotation, and provided with a terminal 17 common to the circuits of both windings, and terminals 18 and 19 connected to the free ends of said windings, whereby the motor will be caused to open or to close respectively the valve 13, according to whether energization is effected of the winding between terminals 17—18 or that between the terminals 17—19.

Associated with the thermocouple 12 are three more or less independent units, a galvanometer unit 20, a potentiometer unit 21, and a thermoelectric battery 22. The galvanometer unit 20 comprises a magnet structure having a conventional north and south poles, N and S, providing an air gap in which a deflecting member 23 is pivoted or suspended for free rotation through a limited angle about an axis perpendicular to the general line of magnetic flux existing in the air gap, and restrained toward a normal neutral or intermediate position by spring means not shown in the drawings. The deflecting member 23 carries a winding 24 adapted to carry an electric current, and thereby to cause said member to be angularly deflected to an extent or with an intensity proportional to the magnitude of said current. Attached to the member 23 and deflectable therewith is a contact arm carrying a contact member 26, adapted to engage either of a pair of contacts 27, 28, and thereby alternatively to provide electrical connection therewith. Carried by the member 23 is a further winding 29, similar to, though not necessarily identical with, the winding 24, adapted to carry electric current, and having one terminal connected to the movable contact member 26 and the other terminal free for connection to an outside circuit.

The potentiometer unit 21 comprises an extended slide wire 30 having associated therewith a movable contact 31 which may be positioned at any desired location along the slide wire by means of a manually-adjustable lead screw 32, the position of said movable contact with respect to said slide wire being indicated by means of an index or pointer 33 in cooperation with a graduated scale 34. A battery or other source of direct current 35, connected to the ends of the slide wire 30 in series with an adjustable rheostat 36, provides through said slide wire a flow of current which may be regulated by means of the rheostat 36 to produce any desired electrical potential gradient over the length of the slide wire. Thus the reading of the index 33 with respect to the scale 34 will provide a measure of the potential existing between a selected extremity of the slide wire and the adjusted position of the contact 31.

The thermoelectric battery 22 comprises a group of thermocouples made up of a suitably selected combination of metals, and having the junctions thereof associated with two heaters 40 and 41 in such a manner that when said heaters are at a common temperature there will be no potential difference between the terminals of the thermoelectric system, and when there exists a difference in temperatures between said heaters there will be developed a potential depending in polarity upon the direction, and in intensity upon the magnitude, of the temperature gradient existing between said heaters. The heaters 40 and 41 are enclosed in a thermally insulating cell 42 and are separated by a barrier 43, whereby heat flow from said heaters to the outside atmosphere and between each other is minimized and controlled. In thermal contact with the heaters 40 and 41 respectively, are electrical resistors 44 and 45, said resistors being connected to a common conductor 46 and having free terminals adapted for connection with an outside electrical circuit.

Electrical connection between the thermocouple 12, the galvanometer unit 20, the potentiometer unit 21, and the thermoelectric battery 22 is provided as follows: One side of the thermocouple 12 is directly connected by means of a conductor 47 to the left-hand extremity of the slide wire 30 as seen in the drawing. The terminals of the winding 24 in the galvanometer unit 20 are connected respectively to the moving contact 31 by means of a conductor 48, and to one terminal of the thermoelectric battery 22 by means of a conductor 49. The remaining terminal of the thermoelectric battery 22 is connected by means of a conductor 50 to the free side of the thermocouple 12. Thus the thermocouple 12, the winding 24, the thermoelectric battery 22, and the portion of slide wire 30 between its lefthand extremity and the point of engagement of the contact 31 form a series connection. The relative polarities of the several elements in the system are so selected that the e. m. f. tapped off from the slide wire 30 will tend to act through the winding 24 in opposition to the thermoelectromotive force set up in the couple 12 due to an increase in temperature within the enclosed space 10. Thus, when said e. m. f.'s are equal, there will exist a condition of balance, whereby the movable contact 26 will be maintained out of engagement with either of the contacts 27—28. Upon a decrease in e. m. f. developed by the couple 12, corresponding to a fall in temperature within the space 10, the direction of current flow through the system will be such as to deflect the member 23 of the galvanometer in a counter-clockwise sense, bringing the contact members 26—28 into engagement and completing an electric circuit therebetween. Similarly, upon an increase of the temperature to which the couple 12 is exposed, the member 23 of the galvanometer will be deflected in a clockwise sense, tending to bring the contact members 26—27 into engagement. Adjustment of the contact member 31 toward the right as seen in the drawing will increase the e. m. f. obtained from the slide wire, thus opposing that derived from the couple 12, and tending to offset the condition of unbalance set up by an increase in the measured temperature. Conversely, an adjustment of the contact member 31 toward the left will tend to restore the balance after a lowering of the temperature to which the couple 12 is exposed. Thus, by manual positioning of the contact 31 by means of the lead screw 32, there may be established at will any desired temperature setting as indicated by the pointer 33 on the scale 34, at which value of temperature in the enclosed space 10 the moving element of the galvanometer 20 will tend to rest with the contacts in a neutral position.

So long as the heaters 40 and 41 remain at a common temperature, the thermoelectric battery 22 will develop no e. m. f., and will therefore have no effect upon the total tendency of current to circulate in the system including said battery, etc. Polarities are so selected that upon a rise in temperature of the heater 41 due to energization of the resistor 45, there will be set up in said battery an e. m. f. tending to cause circulation of a current through the associated network in such a sense as to deflect the galvanometer in a clockwise direction, thus tending to move the contact 26 away from contact 28 and toward contact 27, simulating the effect of an increase in temperature at the couple 12. In a similar manner, upon energization of the resistor 44, the temperature of the heater 40 will increase above that of the heater 41, causing the thermoelectric battery 22 to force through the circuit a current which will tend to deflect the galvanometer in a counter-clockwise sense, with a corresponding tendency to move the contact element 26 away from an engagement with the element 27, simulating the effect of a decrease in the measured temperature.

Associated with the apparatus thus far described is a relay unit 55 comprising two identical relays 56 and 57, each having a set of normally-open contacts and a set of normally-closed contacts, and a third relay 58 having only normally-closed contacts. The relay 58 may, if desired, be provided with a short-circuited lagging coil or shroud 59 whereby there will be introduced an element of time delay between energization of said relay and the opening of its contacts.

Electrical connections whereby the motor-operated valve 13 is made responsive to the galvanometer 20 are provided in the following manner: A source of direct current is provided by two conductors 61 and 62; and between these conductors are connected in series two similar resistors 63 and 64 having a conductor 65 attached to their common point, and to one side of the normally-closed contacts of the relay 58. The conductor 62 is connected to one end of the actuating winding of each of the relays 56 and 58, and also to the conductor 46 and to the terminal 17 of the valve motor 16. The conductor 61 is connected to one terminal of the actuating winding of the relay 57, and also to one side of the normally-open contacts of each of the relays 56 and 57. One side of the normally-closed contacts of the relay 56 is connected by means of a conductor 66 to the terminal 19 of the valve motor 16 and also to the free terminal of the resistor 45. One side of the normally-closed contact of the relay 57 is connected by means of a conductor 67 to the terminal 18 of the valve motor and also to the free terminal of the resistor 44. The free terminals of each of the four sets of contacts in the relay 56 and 57 and also the free terminal of the actuating winding of the relay 58 are connected together by means of a conductor 68. The free terminal of the actuating winding of the relay 56 is connected by means of a conductor 69 to the galvanometer contact 27, and the corresponding terminal of the relay 57 by means of a conductor 70 to the galvanometer contact 28. A conductor 71 provides connection between the free terminal of the galvanometer winding 29 and that of the normally-closed contacts of the relay 58, whereby, when the movable contact 26 engages either of the stationary contacts 27—28, a connection will be established from either the conductor 69 or the conductor 70 (according to which of the stationary contacts is engaged by the movable contact) through the winding 29, the conductor 71, the contacts of relay 58 and the conductor 65 to the mid-point of the interconnected resistors 63—64.

The operation of the apparatus may be described as follows: Assuming, first, a condition of balance in which the temperature within space 10 is in agreement with the value established by the position of the contact 31 with respect to the slide wire 30, and indicated by the pointer 33 upon the scale 34, the potential set up by the thermocouple 12 will be balanced by that derived from the slide wire 30, so that, with the heaters in the thermoelectric battery 22 at equal temperatures, there will be no net e. m. f. in the circuit including the galvanometer coil 24. The galvanometer will therefore rest with the contact 26 out of engagement with either of the contacts 27—28. Under this condition, the relays 56 and 57 will remain deenergized, with the circuits of their normally-closed contacts completed, whereby the terminals 18 and 19, through the conductors 67 and 66 respectively, and said relay contacts will both be connected to the conductor 68; but, there being no complete circuit whereby power may be applied to the motor 16, the latter will remain at rest. Both terminals of the winding of relay 58 being at the potential of conductor 62, said relay will remain de-energized, and will rest with its contacts closed, thus maintaining the movable galvanometer contact 26 at a potential intermediate the conductors 61 and 62.

It may now be assumed that for some reason the temperature within the enclosed space 10 has fallen below a value corresponding to the indication of the pointer 33 upon the scale 34. The e. m. f. set up by the couple 12 will no longer be sufficient to balance that derived from the slide wire 30; and consequently there will flow through the galvanometer winding 24 a current tending to deflect the moving element of the galvanometer in a counter-clockwise sense, bringing the contact members 26—28 into engagement. A circuit will thus be established from the contact 65, connected to the mid-point of the resistors 63—64, through the contacts of relay 58, the conductor 71, the conductor 70, and the winding of the relay 57, to the conductor 61. The circuit so constituted will thus form a loop in parallel with the resistor 64; and, the combination of said loop and said resistor being connected across the supply in series with the resistor 63, there will be caused to flow through the galvanometer winding 29 and the actuating winding of the relay 57, a current whose magnitude will be determined by the resistance values of the several elements of the network in relation to the applied voltage. The polarity of the winding 29 is so selected that the current flowing therethrough will tend to reinforce the effect of the current flowing through the winding 24, and responsible for the original deflection of the moving element 23 of the galvanometer. The pressure existing between the contact members 26—28 will thus be augmented, with a consequent tendency to break down any initial surface resistance which might have existed; and any further increase of current through the winding 29 due to the improvement of contact conditions will tend still further to increase the pressure between the engaging surfaces, so that the current flowing through the winding of the relay 57, if not initially of sufficient magnitude to actuate said relay, will tend to increase its value until the desired magnitude is attained and the relay energized, whereupon the normally-closed contacts of the relay will be opened, and a circuit completed through the normally-open contacts.

The closing of the last-named contacts of the relay 57 will provide a path from the conductor 61 to the conductor 68, and thence through the normally-closed contacts of relay 56 to the conductor 66, and, thence to the terminal 19 of the motor 16. The terminal 17 of said motor being connected to the conductor 62, the voltage of the supply line will be applied to the winding of the motor 16 between the terminals 19 and 17, whereby said motor will be caused to operate in a sense to open the valve 13, increasing the supply of fuel to the burner 11, thus tending to elevate the temperature within the enclosed space 10 to the pre-established value, whereupon the E. M. F. set up between thermocouple 12 will again be sufficient to balance that derived from the slide wire 30, and bring the galvanometer to a state of rest with its contacts open. In a similar manner, should the temperature to which the couple 12 is exposed rise above the pre-established value, the galvanometer element will be deflected in a clockwise sense, causing a circuit through the contacts 26—27 to energize the relay 56, whereby the motor 16 will be caused to operate in a sense to close the valve 13 and correspondingly reduce the measured temperature.

While the performance of the apparatus as thus far set forth provides an automatic control of temperature within the space 10, such control, if not subjected to certain modifications herein provided will be subject to instability and overshooting, and will be unsuited to conditions requiring a precise regulation of temperature; and it is for the purpose of superimposing such modifications upon the fundamental control that there is included in the present embodiment the supplementary elements whose combined operation will now be described.

Upon the energization of either of the relays 56—57, and the consequent closing of their normally-open contacts, the conductor 68, as hereinbefore pointed out, will be connected to the line conductor 61; and since said conductor 68 is connected to one terminal of the actuating winding of the relay 58, whose other terminal is connected to the line conductor 62, the full voltage of the line will be applied to this winding, and the relay 58 caused to open its normally-closed contacts. The opening of said last-named contacts will interrupt the circuit through the galvanometer winding 29 and the actuating winding of whichever of the relays 56—57 may be energized, causing said relay to be released, and at the same time removing the auxiliary influence tending to force the galvanometer contacts into firm engagement. The releasing of the relay 56 or 57 will cause the motor 16 to be de-energized and brought to rest. The elimination of the influence of the winding 29 will leave the galvanometer subject solely to such moment as may be developed in the winding 24. If the measured temperature has been restored to the pre-established value the galvanometer will revert to its neutral position and its contacts will open, though, the circuit through the winding 29 having already been opened by the relay 58, the galvanometer contacts will not be required to break any current. If a condition of unbalance still exists, the cycle will be repeated, and the motor subjected to a further impulse in a sense to reduce the departure of the measured temperature from the pre-established value. The valve will thus tend to approach its final setting consistent with the fuel demand by a series of impulses, until a condition of equilibrium between supply and demand is attained.

The timing of the impulses will be governed in part by the interval elapsing between the action of relay 56 or 57 and the opening of the contacts of relay 58, this in turn being subject to such delay in the operation of the latter relay as may be introduced by the lagging coil or shroud 59. Because the action of the galvanometer is subject to the joint influence of currents in the measuring and control circuits respectively, and as the former current progressively becomes less as a condition of balance is approached, the balancing impulses will tend to become more widely separated, and, as said condition is attained, will disappear, and the galvanometer will stand with its contacts open.

The resistors 44 and 45, being connected in common to the conductor 46, and thence to the line conductor 62, and having their free terminals connected to the conductors 67 and 66 respectively, will be energized concurrently with the corresponding windings of the motor 16. When the relay connections are such as to apply line voltage between the terminals 19 and 17 of said motor, causing the valve 13 to be opened, the resistor 45 will be energized, raising the temperature of the heater 41, whereby, as hereinbefore set forth, there will be developed in the thermoelectric system, an E. M. F., which, being superimposed upon the voltages existing in the thermoelectric system will simulate the effect of an increase in temperature at the couple 12, and thus tend prematurely to reduce the current in the winding 24 toward a zero value and restore the galvanometer to its neutral position.

In a similar manner, when voltage is applied between terminals 18 and 17 of the motor 16, causing the valve 13 to be closed, the resistor 44 will be energized, raising the temperature of the heater 40. This will cause a thermoelectromotive force from the generator 22 to be superimposed upon voltages existing in the measured circuit in a sense to simulate the effect of a decrease in the measured temperature and thus anticipate the cooling effect which will take place pursuant to the closing action of the valve 13. While, by the provision of suitable thermal contact means, it is possible to communicate temperature changes directly from the resistors 44 and 45 to the elements of the thermoelectric battery 21, it has been found that the effect so produced is in general too abrupt for satisfactory performance. The "heaters" 40 and 41, therefore, comprise masses having appreciable thermal capacity and inertia, whereby the sudden impulses of heating influence due to energization and de-energization of the resistors are to some extent merged and integrated over appreciable intervals of time. By suitably selecting the relative proportions of the resistors, heaters, and thermocouples in the generator 22, the magnitude and time lag of the superimposed e. m. f. may be modified to values commensurate with the speed of operation of the valve 13, the time lag of the oven or furnace 10, and such other delaying influences as may characterize the installation. There has thus been provided a control system in which a pre-established control point, as determined by an electrical measuring circuit is approached by a regulating member operating in a series of successive increments, and where at the same time there is introduced into the electrical circuit an influence tending to anticipate conditions attendant upon an ultimate attainment of said control point, the magnitude of said influence being directly subject to the frequency and direction of said increments.

In Fig. 2 is shown the manner in which a control system performing temperature measurement upon the principles of the resistance thermometer may be adapted to the purpose of the invention. An electrical network is made up of the following interconnected resistance units: A temperature-sensitive resistor 75, having a positive temperature resistivity co-efficient, and adapted to be exposed to the temperature under measurement and control, a slide-wire resistance 76 of an order of magnitude approximating the change which will take place in the resistor 75 with a variation of temperature through the range of measurement, a fixed resistor 77 having a value approximating the minimum value of the resistor 75, two equal fixed resistors 78 and 79, and two temperature-sensitive resistors 80 and 81 both having a positive temperature resistivity co-efficient, and of equal resistance values when at a common temperature value. Said resistance units are connected as shown in Fig. 2, to form a closed loop; and from the junction point between resistors 75 and 79 to the junction point between resistors 77 and 78 is connected a battery 82, serving as a source of D.-C. supply. Associated with the slide wire 76 is a movable contact 83, and from said contact to the junction point between temperature-sensitive resistors 80 and 81 is connected the winding of a galvanometer 84, corresponding in arrangement and function with the galvanometer winding 24 shown in Fig. 1.

The network thus completed constitutes a bridge system in which the several resistance values may be so related that, with potential from the battery 82 applied to the circuit, the two points of connection of the galvanometer will be at a common potential, indicating a condition of balance. Assuming the resistors 80 and 81 to be maintained at a common temperature, any change in the temperature of the resistance 75 will tend to disturb the balance of the bridge network. An increase in said temperature will be reflected in a corresponding increase in resistance value; and it will be apparent that balance may be restored by shifting the movable contact 83 with respect to the slide wire 76. In this manner the network becomes a resistance thermometer of the bridge type, with the position of the movable contact 83 providing a measure of the temperatures to which the resistance unit 75 is exposed. With the contact 83 made manually adjustable, it may be set at any desired point, whereupon a balanced condition of the network can be obtained only when the temperature to which the resistor 75 is exposed is the same as that represented by the setting of the contact 83 with respect to the slide wire 76. With the slide wire and contact 12 provided with a scale and pointer, as are the corresponding parts in Fig. 1, and, the galvanometer equipped with contacts and connected in a control circuit similar to that shown in Fig. 1, the temperature-sensitive network may be used as a basis of regulation of a temperature as measured by the unit 75.

Thermally associated with the temperature-sensitive resistors 80 and 81 are heaters 85 and 86, corresponding to the heaters 40 and 41 shown in Fig. 1, and adapted to have their temperatures affected respectively by the energy losses in juxtaposed resistance units 87 and 88 connected in the control circuit similarly to the resistors 44 and 45 in Fig. 1.

Control connections for other elements of the system not shown in Fig. 2 are made in a manner substantially identical with corresponding elements indicated in Fig. 1 and the resistance units 87 and 88 are so associated with the control circuit that, upon a fall in measured temperature, reflected in a decrease in the resistance value of the unit 75 and a corresponding unbalance of the bridge network, with a resultant control condition tending to admit an increased fuel supply, the resistance unit 87 will be energized concurrently with the motor valve, communicating energy loss to the heater 85 and thence to the temperature-sensitive resistance unit 80. The increase in resistance of the unit 80 will take place before the temperature to which the unit 75 is exposed has had time to rise to the control point, so that the ultimate rebalancing of the bridge circuit will be anticipated by the change in the resistance of the unit 80, and the control mechanism thus brought to rest prior to the regulated temperature having attained the established value. In a similar manner, upon an increase in temperature to which the unit 75 is exposed, the bridge circuit will be unbalanced in a manner to cause a decrease in fuel supply, tending to lower said temperature; but current from the control circuit, traversing the resistor 88, will cause the heater 86 and the temperature-sensitive resistor 81 to increase their temperature, tending to restore the balance of the measuring network prior to the regulated temperature having attained the established value. The control circuit being substantially identical to that shown in Fig. 1, the action of the fuel valve, and also of the heating resistors 87 and 88, will be subject to a series of increments, whereby the previously discussed advantageous influences will be superimposed upon the performance of the apparatus.

In Fig. 3 is shown a bridge network suited to the purposes of the invention, and similar in all respects to that shown in Fig. 2, with the exception that instead of the anticipatory action being introduced by means of two resistors 80 and 81, both having positive temperature coefficients and connected in adjacent arms of the bridge, the resistance unit 81 of Fig. 2 is replaced by a unit 90, formed of material such for example as the tellurium-silver alloy set forth in U. S. Patent No. 2,264,073 granted to H. T. Faus, November 5, 1941, having a negative temperature coefficient. The unit 90 is associated with the heater 86 in a manner similar to the unit 81 shown in Fig. 2; and, in order to make use of the negative temperature characteristic of the unit 90, wherein an increase of temperature produces a decrease of resistance, it is necessary that the units 90 and 80 be in the same arm of the bridge. The galvanometer terminal, therefore, which in Fig. 2 is indicated as being connected between the resistors 80 and 81, will in Fig. 3 be connected between the resistors 90 and 79. In order to preserve the symmetry of the network, it then becomes necessary to modify the values of one or both of the resistors 78—79, so that the value of resistor 79 will be equal to the sum of the value of the resistor 78 and the normal values of the resistors 81 and 90.

The operation of the system shown in Fig. 3 will be substantially identical to that shown in Fig. 2. So long as units 81 and 90 remain at a common temperature there will be no difference in performance from that of the previously disclosed embodiment. Decrease in the temperature to which the element 75 is exposed will result in a lowering of its resistance with a consequent tendency of the control system to open the fuel valve, and at the same time to raise the temperature of the unit 80 whereby the restoration of unit 75 to its original value will be anticipated. This element of the performance is identical with that described in connection with the form of the invention shown in Fig. 2. In the event of a rise in the temperature to which element 75 is exposed, the control system will be energized in a manner to close the fuel valve and at the same time to pass current through the resistor 88, and thus to raise the temperature of the heater 86 and the resistance unit 90. The latter resistance unit, having a negative temperature characteristic, will tend to lower its resistance, and thereby anticipate the balancing influence subsequently to appear by the restoration of the unit 75 to its original pre-established temperature value. The control circuit being substantially identical to that shown in Fig. 1, the action of the fuel valve and also of the heating resistors 87 and 88 will, as in the form shown in Fig. 2, be subject to a series of increments, whereby the previously discussed advantageous influences will be superimposed upon the performance of the apparatus.

In the design and operation of a control system adapted to the purposes of the invention there will be encountered certain variations which cannot always be compensated for solely by adjustment. Among these may be mentioned the electrical characteristics of the valve motor, the flow characteristics of the valve, and the inherent time lag of the thermal transfer apparatus and of the mass of material undergoing treatment therein. Because of these variables it has been found that optimum performance is sometimes obtained with the resistors 44 and 45 permanently connected to the corresponding windings of the motor 16, as shown in Fig. 1, while under other conditions operation is improved by separation of said resistors from the motor terminals at such times as they are not energized from the supply lines.

The effect of having the resistors connected across the motor terminals is two fold. (1) With the motor deenergized, each resistor will act as a partial short circuit across the corresponding winding, supplying a degree of dynamic braking whose magnitude will depend greatly upon the type and capacity of the motor, and upon the value of the resistor with respect to the electrical characteristics of the motor. (2) Such current as may flow in the resistors due to e. m. f. generated in the motor when disconnected from the power supply, and due also to the inductive effect of the motor windings, will tend to raise the temperature of one or both the heaters 44 and 45 thereby modifying the influence introduced in the measuring system temporarily to affect the control point, and thus the performance, of the apparatus.

Reactions between the motor windings and the heater resistor may or may not be desirable according to the physical characteristics of the system; and in Fig. 4 are shown means whereby such reactions may if desired be eliminated, by a modification of the relays 56 and 57 shown in Fig. 1, and their associated electrical circuits. To said relays 56 and 57 are added normally closed contacts 91 and 92 respectively, each having one side connected to the conductor 68. The connection of the resistor 44 is transferred from conductor 67 as shown in Fig. 1 to contact 92 shown in Fig. 4; and the connection of resistor 45 is similarly transferred from conductor 66 to the contact 91 of relay 56. With this revised arrangement, it will be seen that, so long as relay 56 is deenergized, the resistor 45 will be connected in parallel with the winding between the motor terminals 19 and 17 as shown in Fig. 1, but, that when said relay is energized the heater and the motor winding will be mutually disconnected, whereby to prevent the possibility of circulation of current therebetween. Similarly when relay 57 is de-energized the resistor 44 will be connected across the terminals 18 and 17 of the motor, and, when said relay is energized, will be disconnected from the motor winding between said terminals. Thus, when the motor 16 is energized for operation in either direction, the corresponding heater resistor will be energized from the same source, while the heater resistor associated with that winding which when energized operates the motor in the opposite direction will be open-circuited and will not carry current to produce any reaction either upon the motor or upon the associated heater.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A control system comprising means alternatively operable in opposite directions for regulating a variable temperature to a predetermined value, and including an electrical bridge network adapted to be balanced when said value is attained, relay means responsive to unbalance of said network for activating said regulating means in a direction dependent upon the sense of said unbalance, said network including an element variable in value with changes in said temperature, and an arm of said network comprising two portions respectively variable in opposite senses with temperature, means for heating one of said portions when said regulating means is operating in one direction, and means for heating the other of said portions when said regulating means is operating in the other direction.

2. A control system comprising means alternatively operable in opposite directions for regulating a variable temperature to a predetermined value, and including an electrical bridge network adapted to be balanced when said value is attained, relay means responsive to unbalance of said network for activating said regulating means in a direction dependent upon the sense of said unbalance, said network including an element variable in value with changes in said magnitude, and an arm of said network comprising two portions respectively variable in opposite senses with activity of said regulating means, means for introducing variation in one of said portions when said regulating means is activated for operation in one direction, and means for introducing variation in the other of said portions when said regulating means is activated for operation in the other direction.

3. In a control system for regulating a variable temperature, means for developing in an electrical circuit an influence in magnitude and direction representative of the deviation of said temperature from a predetermined control value, reversible motor means, a regulating element, means subject to conditions in said circuit for causing said motor to actuate said regulating element in a series of impulses of substantially uniform duration in the same direction and of time separation increasing progressively as said value is approached, and means for producing in said circuit influences opposing the first mentioned influence and in magnitude decreasing with increase in time separation of said impulses.

4. In a control system for regulating a variable temperature, means for developing in an electrical circuit an e. m. f. in magnitude and direction representative of the deviation of said temperature from a predetermined control value, a reversible electric regulating motor having opposed windings, means subject to conditions in said circuit for energizing one or the other of said windings dependent upon the direction of said e. m. f. and for producing operation of said motor in a corresponding direction in increments of substantially uniform duration spaced by time periods progressively increasing as said control value is approached, separate resistors connected across the respective motor windings, means for energizing one of said resistors during increments of operation of said motor in one direction, means for energizing the other of said resistors during increments of operation of said motor in the opposite direction, and means responsive to energization of each resistor for producing an e. m. f. opposing the first mentioned e. m. f. and in magnitude decreasing with increase of time spacing of said increments of motor operation.

5. A control system as defined by claim 4, wherein each of said resistors is continuously connected across the respective motor winding.

6. A control system as defined by claim 4, including means for disconnecting one of said resistors from its associated motor winding when the other motor winding is energized.

7. In a control system for regulating a variable temperature, means for developing in an electrical circuit an e. m. f. in magnitude and direction representative of the deviation of said temperature from a predetermined control value, a pair of spaced electrical contacts, means responsive to said e. m. f. for movement into engagement with one or the other of said contacts depending upon the direction of said e. m. f., said responsive means being out of engagement with both said contacts when said variable is at said control value, a reversible electric regulating motor, means for energizing said motor for rotation in one direction or the other dependent upon which of said contacts is engaged by said responsive means, a pair of resistors, connections for energizing one or the other of said resistors depending upon which of said contacts is engaged by said responsive means and for maintaining both resistors deenergized as long as said responsive means is engaged with neither of said contacts, relay means brought into action at the expiration of a predetermined period following engagement of either of said contacts by said responsive means for deenergizing said motor and the previously energized resistor and concurrently establishing connections for re-energization of said resistor and motor in the event of continued engagement of said responsive means with one of said contacts, temperature-sensitive voltage-affecting means in thermal association with said resistors to be influenced by temperature changes therein and to introduce into the first-mentioned circuit an e. m. f. dependent in direction upon the contact engaged by said responsive means and in intensity upon the voltage applied to the motor pursuant to said contact engagement.

8. A system for controlling a variable temperature to maintain the latter at substantially a predetermined value, said system comprising an element for regulating a temperature, an electric motor for operating said element, means for developing in an electrical circuit an e. m. f. in magnitude and direction representative of the deviation of said temperature from said predetermined value, a galvanometer responsive to said e. m. f., connections controlled by said galvanometer for operating said motor to reduce said deviation in successive acyclic impulses in the same direction and of time separation increasing progressively as said value is approached, and means controlled by said galvanometer for superimposing upon said e. m. f. a supplementary e. m. f. dependent in direction upon the sense of said deviation and in magnitude upon the time separation of said impulses.

9. In a system for controlling a variable temperature to maintain the latter at substantially a predetermined value, temperature regulating means comprising an electric motor, means for developing in an electrical circuit an e. m. f. in magnitude and direction representative of the deviation of said temperature from said predetermined value, a galvanometer responsive to said e. m. f., connections including relays controlled by said galvanometer for operating said motor to reduce said deviation in successive acyclic impulses in the same direction and of time separation increasing progressively as said value is approached, and means controlled by said galvanometer for superimposing upon said e. m. f. a supplementary e. m. f. dependent in direction upon the sense of said deviation and in magnitude upon the time separation of said impulses.

10. In a system for controlling a variable temperature to maintain the latter at substantially a predetermined value, temperature regulating means comprising an electric motor, means for developing in an electrical circuit an e. m. f. in magnitude and direction representative of the deviation of said temperature from said predetermined value, a galvanometer responsive to said e. m. f., connections including relays controlled by said galvanometer for operating said motor to reduce said deviation in successive impulses of substantially uniform duration in the same direction and of time separation increasing progressively as said value is approached, and means energized under control of said relays concurrently with said impulses to provide in said circuit e. m. f.'s opposing the first-mentioned e. m. f. and in magnitude decreasing with increase in time separation of said impulses 11. In a system for controlling a variable temperature to maintain the latter at substantially a predetermined value, temperature regulating means comprising an electric motor, means for developing in an electrical circuit an e. m. f. in magnitude and direction representative of the deviation of said temperature from said predetermined value, a galvanometer responsive to said e. m. f., connections including relays controlled by said galvanometer for operating said motor to reduce said deviation in successive impulses of substantially uniform duration in the same direction and of time separation increasing progressively as said value is approached, resistance means for developing heating effects, means under control of said relays for energizing said resistance means in impulses of substantially uniform duration and of time separation increasing progressively as said value is approached, and means responsive to the heating effects of said resistance means for producing in said circuit e. m. f.'s opposing the first-mentioned e. m. f.

12. In a control system for regulating a variable temperature, means for developing in an electrical circuit an e. m. f. in magnitude and direction representative of the deviation of said temperature from a predetermined control value, a reversible electric regulating motor having opposed windings, means subject to conditions in said circuit for energizing one or the other of said windings dependent upon the direction of said e. m. f. and for producing operation of said motor in a corresponding direction in acyclic increments spaced by time periods progressively increasing as said control value is approached, separate resistors connected across the respective motor windings, means for energizing one of said resistors during increments of operation of said motor in one direction, means for energizing the other of said resistors during increments of operation of said motor in the opposite direction, and means responsive to energization of each resistor for producing an e. m. f. opposing the first-mentioned e. m. f. and in magnitude decreasing with increase of time spacing of said increments of motor operation.

CARLTON W. BRISTOL.

REFERENCES CITED

The following references are of record in the file of this patent:

UNITED STATES PATENTS

| Number | Name | Date |
|---|---|---|
| 1,689,516 | Bliss | Oct. 30, 1928 |
| 2,022,097 | Uehling | Nov. 26, 1935 |
| 2,025,749 | Hubbard | Dec. 31, 1935 |
| 2,109,222 | Ryder | Feb. 22, 1938 |
| 2,115,834 | Young | May 3, 1938 |
| 2,148,491 | Moore | Feb. 28, 1939 |
| 2,276,506 | Moore | Mar. 17, 1942 |
| 2,376,488 | Jones | May 22, 1945 |

FOREIGN PATENTS

| Number | Country | Date |
|---|---|---|
| 444,673 | Great Britain | Mar. 25, 1936 |